3,752,848
PREPARATION OF TETROLIC ACID
William Novis Smith, Jr., Exton, Pa., assignor to Foote Mineral Company, Exton, Pa.
No Drawing. Filed Nov. 20, 1970, Ser. No. 91,549
Int. Cl. C07c 51/00, 57/18
U.S. Cl. 260—526 N                                    9 Claims

ABSTRACT OF THE DISCLOSURE

Tetrolic acid is prepared by passing carbon dioxide through a slurry in an inert organic liquid of propynyllithium, propynylsodium or propynylpotassium and hydrolyzing the carbonated slurry.

BACKGROUND OF THE INVENTION

Field of invention

This invention relates to a process for preparing tetrolic acid (2-butynoic acid); and more particularly, the present invention relates to a more economical process for preparing tetrolic acid than known theretofore.

Prior art

Tetrolic acid, having the empirical formula $$CH_3C \equiv C-COOH$$

can be prepared by reacting propynylsodium with carbon dioxide in liquefied ammonia, evaporating the liquid ammonia and hydrolyzing the reaction product; however, this process is undesirable since it produces yields of only about 5 to 10% and involves the use of a liquefied gas with the problems inherent therewith.

U.S. Pat. 3,410,918 describes a process for preparing propynylsodium and propynyllithium in which a gaseous mixture of propyne and allene is contacted with a slurry of sodium metal or lithium metal containing a small amount of sodium. It has now been found that propynylsodium and propynyllithium may be efficiently and economically utilized in a novel method for the production of tetrolic acid.

It is, therefore, the principal object of this invention to provide an efficient and economical method for producing relatively pure tetrolic acid in high yields utilizing propynylsodium, propynylpotassium and propynyllithium.

SUMMARY OF INVENTION

According to the present invention, tetrolic acid is produced in a process which comprises passing a stream of carbon dioxide into a slurry in an inert organic liquid of an unsaturated aliphatic alkali metal compound selected from the group consisting of propynylsodium, propynylpotassium and propynyllithium at a temperature of from about —20° C. to about 80° C. and hydrolyzing the carbonated slurry, said slurry being under a substantially oxygen-free atmosphere throughout the process.

DETAILED DESCRIPTION OF THE INVENTION

The preparation of tetrolic acid according to this invention proceeds according to the following equation:

$$CH_3C \equiv CM + CO_2 + H_2O \rightarrow CH_3C \equiv C-COOH + MOH$$

wherein M is sodium, potassium or lithinum metal.

In carrying out this reaction, finely divided propynylsodium, propynylpotassium or propynyllithium is slurried (dispersed) in a suitable inert organic liquid reaction medium. The organic liquid reaction medium should be essentially inert to the propynylsodium, propynylpotassium or propynyllithium and to the carbon dioxide. With propynyllithium, an ether type solvent, such as tetrahydrofuran, ethylene glycol dimethyl ether, and ethylene glycol diethyl ether, may be used. Tetrahydrofuran is preferred. With propynylsodium and propynylpotassium, the foregoing ether type solvents may be used as well as aromatic hydrocarbons such as xylene, toluene, and ethylbenzene, and aliphatic hydrocarbons, like heptane or octane. Xylene is the preferred medium. The amount of liquid is not critical since it merely serves as a liquid medium for holding the propynylsodium, propynylpotassium or propynyllithium in a dispersed condition while the carbon dioxide gas is passed therethrough and reacts with the propynylsodium, propynylpotassium or propynyllithium. Generally, the propynylsodium, propynylpotassium or propynyllithium will be in a molar concentration in the reaction medium of from about 0.3 to about 3. Of course, mixtures of propynylsodium, propynylpotassium and propynyllithium in any proportion may be utilized in this process. When utilizing mixtures of propynylsodium, propynylpotassium and propynyllithium as the unsaturated aliphatic alkali metal component of the reaction, the inert organic reaction medium may be any of those noted above; however, the reaction medium should contain a portion of at least of an ether type solvent when propynyllithium is present in the unsaturated aliphatic alkali metal component.

Carbon dioxide is passed into the slurry of propynylsodium, propynylpotassium or propynyllithium until carbon dioxide is no longer absorbed by the propynylsodium, propynylpotassium and propynyllithium indicating that carbonation is complete. This point can be determined visually by noting the increased rate of bubbling in the reaction mixture indicating that carbon dioxide is no longer being absorbed by the propynylsodium, propynylpotassium or propynyllithium.

The carbonation reaction takes place between the propynylsodium, propynylpotassium or propynyllithium and carbon dioxide in essentially a 1:1 mol ratio. However, an excess of carbon dioxide over the theoretical 1:1 molar ratio is normally utilized since some loss of carbon dioxide during the reaction is unavoidable.

The carbon dioxide should be introduced into the slurry under atmospheric pressure or at pressures slighlty above atmospheric with pressures ranging from about 2 p.s.i. to about 100 p.s.i., about 15 p.s.i. being satisfactory.

Careful control of the temperature of the carbonation reaction has been found critical to a successful operation of this process. In this regard, the reaction slurry should be maintained at a temperature below 80° C. and preferably below 60° C. and down to as low as —20° C. during the carbon dioxide addition. More particularly, it has been found that maintaining the reaction slurry at a temperature of from about 0° C. to about 10° C. during the initial carbonation period, that is, until the reaction is about 50 percent complete, meaning that about one half of the propynylsodium, propynylpotassium or propynyllithium has been converted to the sodium, potassium or lithium salt of tetrolic acid, followed by subsequent warming of the reaction slurry, preferably to from about 60° C. to about 65° C. for the balance of the reaction provides the best yield of the desired product.

It is also preferred that the reaction mixture be agitated during the carbonation, and this may be accomplished by bubbling the carbon dioxide gas into the slurry; however, it is preferred to provide additional agitation during the reaction as by stirring.

In addition, the carbonation reaction is carried out in a substantially oxygen-free atmosphere, as under a blanket of an inert gas such as argon, nitrogen, or the like. Once the reaction has started, the carbon dioxide gas itself can provide the oxygen-free atmosphere.

Carbonation of propynylsodium, propynylpotassium or propynyllithium results in the initial production of the sodium, potassium or lithium salts of tetrolic acid. The desired tetrolic acid is recovered from the reaction slurry containing the sodium, potassium or lithium salts of tetrolic acid by the addition to the reaction slurry of a sufficient volume of water to hydrolyze the lithium, sodium or potassium salts, an amount of water approximately equal to the volume of the inert organic liquid reaction medium being especially suitable for this purpose. The aqueous phase of the hydrolyzed reaction slurry is then separated from the reaction mixture in any convenient manner such as through the use of a separatory funnel. The isolated aqueous phase is then acidified with the addition of a sufficient amount of an inorganic acid such as hydrochloric or sulfuric acid to obtain a pH below about 6, preferably about 2. Finally, the tetrolic acid is recovered from the acidified material by extraction with a solvent such as ether, a chlorinated hydrocarbon such as chloroform, or benzene, preferably ether, followed by removal of the solvent to yield the tetrolic acid in the form of a relatively pure low melting solid.

As an alternative, it has been found that rather than forming a slurry of propynyllithium, propynylsodium or propynylpotassium and passing a stream of carbon dioxide through the slurry, tetrolic acid can be easily produced by the addition of carbon dioxide to the unrecovered product slurry of propynyllithium, propynylsodium or propynylpotassium formed following the procedure outlined in U.S. Pat. 3,410,918. In this regard, the disclosure of Pat. 3,410,918 is specifically incorporated herein by reference thereto.

In carrying out this embodiment of the invention, the tetrolic acid is formed by the addition of carbon dioxide to propynylsodium, propynylpotassium and propynyllithium formed by contacting a slurry of sodium or potassium metal or lithium metal containing a small amount (0.3 to about 2%, preferably from about 0.5 to about 1%, by weight, based on the weight of the lithium) of sodium with a gaseous mixture of propyne and allene in which the weight ratio of propyne to allene is from about 1:1 to about 4:1.

In carrying out this reaction, the finely-divided sodium, potassium or sodium-containing lithium is slurried in a suitable inert organic liquid reaction medium. The useful reaction media are those mentioned hereinabove and include, when lithium metal is utilized in the reaction, ether type solvents such as tetrahydrofuran, ethylene glycol dimethyl ether and ethylene glycol diethyl ether, preferably tetrahydrofuran. With sodium or potassium, any of the foregoing ether type solvents can be used, as well as aromatic hydrocarbons such as toluene, xylene and ethylbenzene, and aliphatic hydrocarbons, like heptane or octane.

The reaction between the slurry of sodium or potassium metal or lithium metal containing sodium and the gaseous mixture of propyne and allene is advantageously carried out at elevated temperatures, generally at least 50° C. and preferably at reflux to ensure maximum rate of reaction, the principal reaction occurring being between the sodium, potassium or lithium and the propyne in a 1:1 mol ratio. The reaction mixture is preferably stirred vigorously to provide constant agitation and the reaction is carried out under a substantially oxygen-free atmosphere.

The gaseous mixture of propyne and allene is passed into the slurry of sodium, potassium or sodium-containing lithium until the reaction is essentially complete as can be determined visually by noting the disappearance of the metallic sodium, potassium or lithium particles and their replacement by white particles of propynyllithium or off-white to pale tan particles of propynylsodium or propynylpotassium.

With the formation of the propynylsodium, propynylpotassium and propynyllithium particles, and the disappearance of the metallic sodium, potassium or lithium particles, the reaction mixture is cooled to a temperature below 80° C., preferably below 60° C. and down to as low as −20° C. and carbon dioxide is added to the product slurry with constant agitation. The slurry is stirred and carbon dioxide is added until no longer absorbed by the propynyllithium, propynylsodium or propynylpotassium. The reaction conditions for the carbon dioxide addition are those referred to in more detail hereinabove.

Following the addition of carbon dioxide to the propynylsodium, propynylpotassium or propynyllithium as outlined above, tetrolic acid is formed without the prior isolation of the propynylsodium, propynylpotassium or propynyllithium. The tetrolic acid is recovered from the reaction mixture according to the procedures outlined above.

As will appear from the following examples which are set forth for the purpose of illustration only, the tetrolic acid produced by the above processes exhibits good purity and is produced in high yield.

Tetrolic acid may be converted to its corresponding ester form with alcohols such as methyl alcohol, ethyl alcohol and isopropanol, in which form it is useful as a flavor and fragrance in the cosmetic and pharmaceutical arts.

EXAMPLE 1

A three-neck, round bottom flask equipped with a gas addition tube, reflux condenser, stirrer and heating mantle is flushed with nitrogen and then charged with a slurry of 27 g. propynylsodium in 300 ml. of xylene. The slurry is cooled to 0° C. and carbon dioxide is bubbled therethrough at 0-2 p.s.i. with agitation. The reaction temperature is maintained at 5° C. After one hour of continuous agitation, the slurry is warmed to 65° C. and then cooled at 20° C. The reaction slurry is then hydrolyzed with the addition of 200 ml. water, and the organic layer is removed from the basic aqueous solution. The basic aqueous solution is then acidified to a pH of 2 with the addition of 5% hydrochloric acid and extracted five times with ether. The ether extracts are combined and the ether is removed under a vacuum. The resultant crude tetrolic acid is mixed with 35 g. sodium sulfate and extracted three times with boiling cyclohexane. The cyclohexane extracts are combined and the cyclohexane is removed under a vacuum to yield 31.8 g. of tetrolic acid having a melting point of 73–75° C. for a yield of 87%.

EXAMPLE 2

The apparatus described in Example 1 is flushed with argon and charged with a slurry of 26.3 g. of propynylsodium in 300 ml. of heptane. Carbon dioxide is bubbled therethrough at atmospheric pressure with agitation while the reaction slurry is heated to 70° C. and then cooled to room temperature. The reaction slurry is then hydrolyzed by adding 200 ml. of water, followed by removal of the organic layer from the basic aqueous solution. The basic aqueous solution is treated as described in Example 1 to yield 8.5 g. of tetrolic acid with a melting point of 72–75° C. for a yield of 23%.

EXAMPLE 3

The apparatus described in Example 1 is flushed with argon and charged with a slurry of 33.4 g. of propynylsodium in 300 ml. of toluene. Carbon dioxide is then bubbled therethrough at about 2 p.s.i. with agitation over a 2.5 hour period while the reaction slurry is maintained at 5° C. The reaction slurry is then heated to 65° C. for 0.5 hour followed by cooling to 20° C. The reaction slurry is then hydrolyzed with 200 ml. water, followed by removal of the organic layer from the basic aqueous solution. The basic aqueous solution is treated as described in Example 1 to yield 20.8 g. of tetrolic acid with a melting point of 72–74° C. for a yield of 46%.

EXAMPLE 4

The apparatus described in Example 1 is flushed with argon and charged with a slurry of 20.8 g. of propynyllithium in 300 ml. of tetrahydrofuran. The reaction slurry is cooled to 0° C. and carbon dioxide is bubbled therethrough at atmospheric pressure with agitation over a one hour period following which the slurry is heated to reflux for 0.5 hour. The slurry is then cooled to 20° C. and hydrolyzed with 200 ml. water, followed by removal of the organic layer from the basic aqueous solution. The basic aqueous solution is treated as described in Example 1 to yield 29.8 g. of tetrolic acid having a melting point of 73–75° C. for a yield of 78%.

EXAMPLE 5

The apparatus described in Example 1 is flushed with argon and charged with a slurry of 6.9 g. of sodium metal in 200 ml. of xylene and the contents are heated to 110° C. with stirring. The resulting dispersion is then heated to 120° C. with stirring, while there is bubbled therethrough a gas mixture containing aout 60–70% of a 2:1 by weight mixture of propyne and propadiene (allene), the balance being saturated hydrocarbons having 1 to 4 carbon atoms, mainly propane and butane (MAPP® welding gas of Dow Chemical Company). The reaction slurry is maintained at 120° C. for two hours until all of the sodium has reacted. The reaction product is then cooled to 35° C. and carbon dioxide is bubbled therethrough at 15 p.s.i. for one hour while the reaction temperature is maintained at 55° C. to 60° C. The resultant slurry is cooled to 40° C. and stirred until carbon dioxide is no longer absorbed. The reaction mixture is hydrolyzed with 150 ml. water, and the organic layer is removed from the basic aqueous solution. The basic aqueous solution is acidified to a pH of 2 with the addition of 5% hydrochloric acid and extracted three times with diethyl ether. The ether extracts are combined and the ether removed under a vacuum to yield 21 g. of tetrolic acid with a melting point of 73–75° C. for a yield of 83%.

EXAMPLE 6

The apparatus described in Example 1 is flushed with argon and charged with a slurry of 10 g. of potassium metal in 200 ml. of benzene and the contents are heated to 60° C. with stirring. The resulting dispersion is then heated to 68° C. with stirring, while there is bubbled therethrough a gas mixture containing about 60–70% of a 2:1 by weight mixture of propyne and propadiene (allene), the balance being saturated hydrocarbons having 1 to 4 carbon atoms, mainly propane and butane (MAPP® welding gas of Dow Chemical Company). The reaction slurry is maintained at 68° C. for three hours until all of the potassium has reacted. The reaction product is then cooled to 10° C. and carbon dioxide is bubbled therethrough at 15 p.s.i. for fifteen minutes. The slurry is then heated to 60° C. and carbon dioxide is bubbled therethrough for five hours at 60° C. The reaction mixture is hydrolyzed with 125 ml. water and the organic layer is removed from the basic aqueous solution. The basic aqueous solution is acidified to a pH of 2 with the addition of 5% hydrochloric acid and extracted three times with diethyl ether. The ether extracts are combined and the ether removed under a vacuum to yield 20 g. of tetrolic acid with a melting point 73–75° C. for a yield of 45%.

Having thus described the invention, what is claimed is:

1. A method for preparing tetrolic acid which comprises introducing carbon dioxide under a pressure of from about atmospheric to about 100 p.s.i. into a slurry in an inert organic liquid selected from the group consisting of aromatic hydrocarbons, aliphatic hydrocarbons, tetrohydrofuran, ethylene glycol dimethyl ether and ethylene glycol diethyl ether of an unsaturated aliphatic alkali metal compound selected from the group consisting of propynyllithium, propynylpotassium and propynylsodium at a temperature of from about −20° C. to about 80° C., and hydrolyzing the carbonated slurry, said slurry being under a substantially oxygen-free atmosphere during the reaction, said inert organic liquid being selected from tetrahydrofuran, ethylene glycol dimethyl ether and ethylene glycol diethyl ether when said alkali metal compound is propynyllithium.

2. The method of claim 1 wherein the inert organic liquid is tetrahydrofuran.

3. The method of claim 1 wherein the unsaturated aliphatic alkali metal compound is propynylsodium or propynylpotassium and is slurried in an inert organic liquid selected from the group consisting of tetrahydrofuran, ethylene glycol dimethyl ether, ethylene glycol diethyl ether, xylene, toluene ethylbenzene, heptane and octane.

4. The method of claim 3 wherein the inert organic liquid is xylene.

5. The method of claim 1 wherein the unsaturated aliphatic alkali metal compound is a mixture of propynyllithium, propynylpotassium and propynylsodium.

6. The method of claim 1 wherein the carbon dioxide is introduced into the slurry under pressure of from about 2 p.s.i. to about 100 p.s.i.

7. The method of claim 6 wherein the carbon dioxide is introduced into the slurry under pressure of about 15 p.s.i.

8. The method of claim 1 wherein the reaction slurry is maintained at a temperature of from about 0° C. to about 10° C. until carbonation is about 50 percent complete, followed by subsequent warming of the reaction slurry to form about 60° C. to about 65° C.

9. The method of claim 1 wherein the tetrolic acid is prepared with the addition of carbon dioxide to a slurry of the propynyllithium, propynylsodium or propynylpotassium formed by passing a gaseous mixture of propyne and allene in which the weight ratio of propyne to allene is from about 1:1 to about 4:1 into a slurry of dispersed alkali metal selected from the group consisting of sodium, potassium and a mixture of lithium and from about 0.3 to about 2%, by weight, of sodium.

References Cited
UNITED STATES PATENTS

| | | | |
|---|---|---|---|
| 2,205,885 | 6/1940 | Jackson et al. | 260—526 |
| 2,605,295 | 7/1952 | Garner et al. | 260—526 |
| 2,799,703 | 7/1957 | Pachter | 260—526 |

VIVIAN GARNER, Primary Examiner

U.S. Cl. X.R.

260—665 R